(12) United States Patent
Sirgo et al.

(10) Patent No.: US 6,248,010 B1
(45) Date of Patent: Jun. 19, 2001

(54) PEELING APPARATUS WITH SEGMENTED ROLLER ASSEMBLIES

(75) Inventors: Scott J. Sirgo; Christopher G. Greve, both of Covington; Ben Rosow, New Orleans; Brent A. Ledet, Jefferson, all of LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/504,680

(22) Filed: Feb. 15, 2000

(51) Int. Cl.[7] ..................................................... A22C 29/00
(52) U.S. Cl. ........................................................ 452/5; 452/9
(58) Field of Search ..................... 452/5, 1, 2, 9

(56) References Cited

U.S. PATENT DOCUMENTS

| | | |
|---|---|---|
| 2,429,828 | 10/1947 | Lapeyre et al. . |
| 2,537,355 | 1/1951 | Lapeyre et al. . |
| 2,574,044 | 11/1951 | Lapeyre et al. . |
| 2,778,055 | 1/1957 | Lapeyre et al. . |
| 2,832,092 * | 4/1958 | Lapeyre et al. ............................ 452/8 |
| 2,840,850 * | 7/1958 | Lapeyre et al. ............................ 452/8 |
| 3,018,510 | 1/1962 | Lapeyre et al. . |
| 3,383,734 | 5/1968 | Lapeyre . |
| 3,626,551 | 12/1971 | Lapeyre . |
| 3,685,098 | 8/1972 | Lapeyre . |
| 3,706,113 * | 12/1972 | Lapeyre et al. ............................ 452/5 |
| 3,740,795 | 6/1973 | Cox . |
| 3,816,877 | 6/1974 | Bullock . |
| 3,971,102 | 7/1976 | Skrmetta . |
| 3,975,797 | 8/1976 | Grimes et al. . |
| 4,400,849 | 8/1983 | Dell . |
| 5,005,258 | 4/1991 | Griffis et al. ............................ 452/18 |
| 5,108,342 | 4/1992 | Lapeyre et al. ............................ 452/5 |
| 5,120,265 * | 6/1992 | Leder et al. ............................ 452/5 |
| 5,346,424 | 9/1994 | Chiu et al. ............................ 452/5 |
| 5,980,373 | 11/1999 | Rosow et al. ............................ 452/5 |
| 6,017,268 * | 1/2000 | Rosow et al. ............................ 452/5 |

FOREIGN PATENT DOCUMENTS

82518 * 9/1953 (NO) ......................................... 452/5

* cited by examiner

Primary Examiner—Willis Little
(74) Attorney, Agent, or Firm—James T. Cronvich

(57) ABSTRACT

Apparatus for peeling shrimp including powered roller assemblies each made up of a peeling roller and a drive member attached by a releasable connection. Roller connection structure at a first end of each roller assembly mates with reciprocal drive connection structure in the drive member. An adjustable element extending through the drive member allows the connection to be released and the roller assembly separated into a roller segment and a drive member segment. In other versions the roller segment can be composed of a series of segments having the same or different peeling surface characteristics in which the individual roller segments are similarly releasably connected.

23 Claims, 15 Drawing Sheets

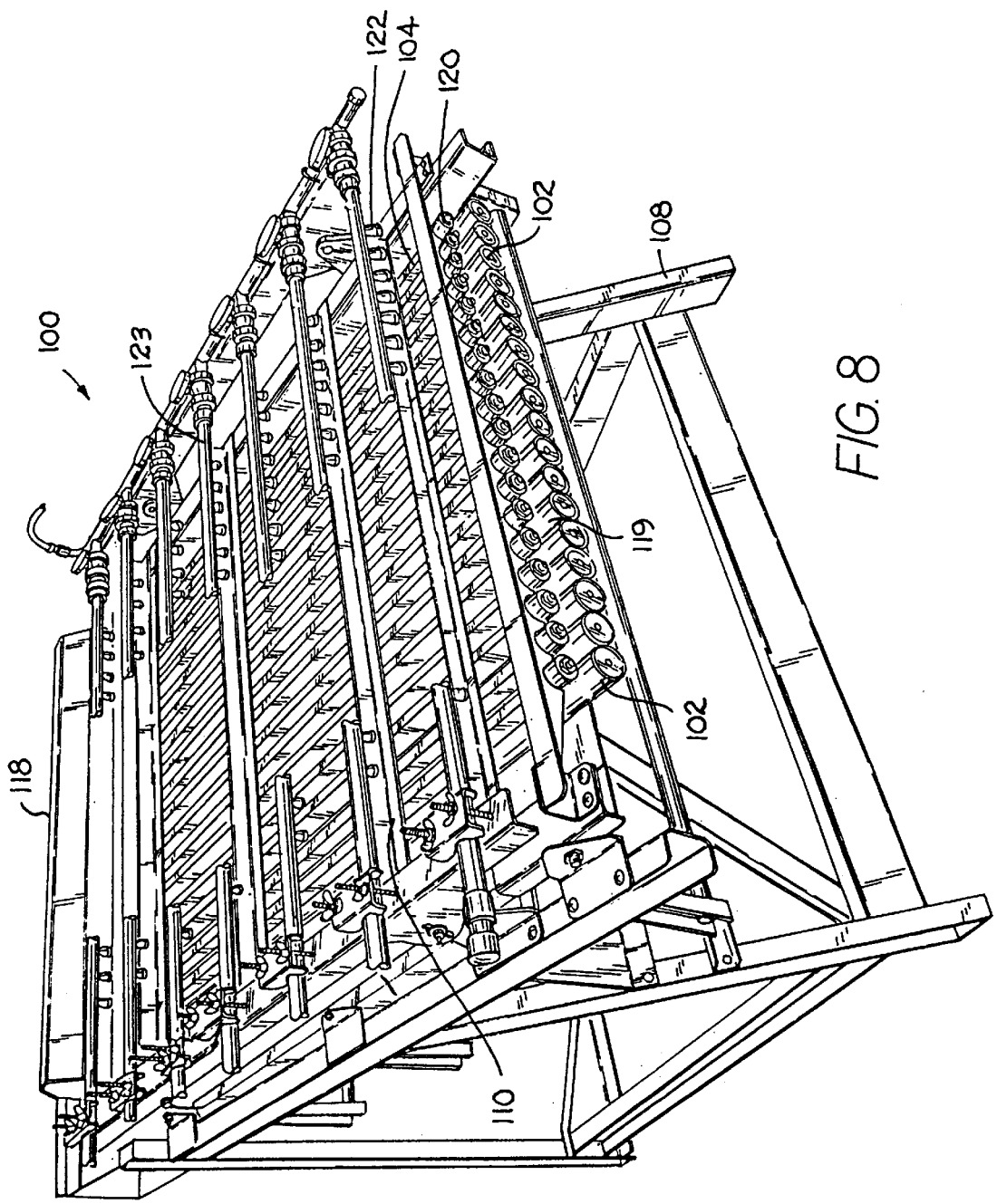

PEELING APPARATUS WITH SEGMENTED ROLLER ASSEMBLIES

BACKGROUND OF THE INVENTION

1. Field of the Invention

This invention relates to peeling apparatus and, more particularly, to roller-type shrimp-peeling machinery using an array of segmented roller assemblies to remove shells from shrimp meat.

2. Description of the Related Art

Originally introduced because of the high labor costs of peeling small shrimp by hand, shrimp peeling machines are now widely used in the shrimp processing industry. Roller-type shrimp-peeling machines, in particular, dominate the bulk shrimp peeling industry. U.S. Pat. Nos. 2,778,055, Jan. 22, 1957, and 2,537,355, Jan. 9, 1951, both to Fernand S., James M., and Emile M. Lapeyre, describe the basic structure and principles of operation of roller-type shrimp peelers.

U.S. Pat. No. 2,778,055 shows a peeling machine with a rigid framework supporting the peeling elements. A transverse beam divides the machine into two peeling sections. The upper peeling section extends from a rear wall to the beam; the lower peeling section extends from the beam to the lower front end of the machine. Shell-on shrimp are fed over the rear wall to the upper peeling section. Channels are formed in the upper peeling section by groups, or associations, of five rollers for each channel. The association of rollers includes a power roller forming the base of the channel, two channel-forming rollers flanking and spaced slightly above the power roller, and two small-diameter insert rollers between the power roller and the channel-forming rollers. The power rollers extend the full length of the machine through both the upper and lower peeling sections. The power rollers are supported in the lower peeling section by base idler rollers. All of the rollers incline downwardly from the rear wall to the front end of the machine. The channel-forming rollers and the insert rollers extend only the length of the upper peeling section and are mounted at the rear wall and at the transverse beam. The power rollers and the channel-forming rollers are mounted in fixed locations so that their peripheries are separated a distance slightly less than the diameter of the insert rollers. In this way, the insert rollers, which are not fixedly mounted as are the power and channel-forming rollers, can be forcibly urged by spring pressure into the gaps between the power and channel-forming rollers. The spring pressure provides a tight nip between the insert roller and the power roller. In the lower peeling section, two power rollers and a base idler roller at a lower elevation form an inverted triangular lower peeling channel. The power rollers rotate the base idler roller by frictional contact. The power rollers rotate in alternate directions to force shrimp in the upper peeling section into the nips on one side of the channel and then into the nips on the other side of the channel. The shrimp are unwrapped of their shells in the nips, the shells falling as waste through the gaps between the power roller and the channel-forming rollers. Most of the peeling is effected in the upper peeling section. Shells not removed in the upper peeling section are further subjected to pinching action between the large-diameter power rollers and the base idler roller in each channel of the lower peeling section.

The power rollers and the channel-forming rollers are typically constructed of a metal tube or pipe having a rubber coating. Integral with an end of each roller is a gear mounted on a stub shaft. The stub shafts are supported by bearings in the rear wall of the peeler. A suitable drive mechanism is described in U.S. Pat. No. 3,626,551, Dec. 14, 1971, to J. M. Lapeyre. The mechanism includes a gear rack that meshes with the teeth of the gears of the power and channel-forming rollers. A drive motor, through linkages including a pitman arm and cranks, causes the rack to reciprocate back and forth and the engaged rollers to oscillate in alternating rotational directions.

With use, the rubber coating on the power and channel-forming rollers wears off and the rollers have to be replaced. Because the gear is integral with each roller, it must be disengaged from the rack when the roller is removed. More critically, when a new or refurbished roller is installed in the peeler, the roller must be positioned carefully to make sure that its gear meshes precisely with the rack to avoid backlash and other undesirable properties caused by sloppy gear meshing. Aligning the rollers and meshing their gears properly take a lot of trial and error, making roller replacement a time-consuming task.

Another problem is that shrimp slime and other debris can splash into the exposed gear mechanism at the top of the peeling channels. Fouling and corrosion of the gears can result from such debris and juices. Conversely, grease or other gear lubricants can make their way into the peeling channels. Thus, exposure of the gears to the peeling channels is undesirable.

Because the gear is integral with the roller, other problems arise. As one example, the gear teeth are subject to damage during handling of the heavy rollers because the teeth are exposed at the end. Thus, the rollers must be handled more carefully. Because of the gear, the rollers cannot be stored as compactly either because the gear diameter is greater than the roller diameter. As another example, the rubber is put on the roller in an extrusion process. Because the extruder cannot accommodate the larger diameter of the gear, the extrusion process must be stopped for each roller. The gearless end of the roller must then be backed into the extruder for the entire length of the roller before the extruder is restarted and the roller moves forward and is coated with the rubber layer. Thus, the integral gear is not conducive a faster, continuous extrusion process.

SUMMARY OF THE INVENTION

These and other problems and shortcomings are solved by peeling apparatus and roller assemblies having features of the invention. The peeling apparatus includes an array of powered roller assemblies supported side-by-side in a frame. Each powered roller assembly has a peeling roller and a drive member. A drive system engages the drive member to rotate the roller assembly. Roller connection structure at one end of the peeling roller mates with drive connection structure in the drive member to form a connection between the roller and the drive member. An adjustment element extending through the drive member allows the connection to be released. In this way the roller portion of the assembly can be separated from the drive member to simplify roller replacement. Because the drive member remains engaged with the drive system during roller replacement, the releasable connection avoids the time-consuming trial-and-error method of realigning and retensioning the drive system to the roller drive members. Furthermore, because the drive member can be separated from the peeling roller, the roller has no attached gear and a more efficient continuous extrusion process can be used to coat the rollers with fresh rubber.

Different versions of the releasable connection between the peeling roller and the drive member are possible. For example, a frustoconical extension from the roller into a mating receptacle forms a connection. The adjustment element, such as a bolt, extending into the roller connection structure presses the extension tightly into the mating receptacle. In another example, the connection comprises a splined, taper lock that is effective in providing both drive transmission and axial rigidity, or bending resistance, to the connection.

In yet another version of the releasable connection, the roller connection structure is formed by an axial opening circumscribed by a wall. The drive connection structure includes a compression element, such as a plastic annulus, between two relatively movable washers, that fits in the axial opening of the roller connection structure. As the adjustment element is tightened, the compression element frictionally engages the wall to retain the drive member to the roller. Loosening the adjustment element releases the connection by relaxing the compression element from its frictional engagement with the wall.

Besides enabling the peeling roller to be readily separated from the drive member, releasable connections can also be used to divide the peeling roller into a series of axially connected roller segments. A similar connection structure can be used between roller segments. A segmented roller has a number of advantages. Adding segments allows the lengths of the rollers to be customized for various applications. Storage of smaller roller sections rather than of complete rollers is more convenient. Segments can be made of different materials, such as rubber, polyurethane, and stainless steel, or have different surface textures to provide different peeling characteristics along the peeling channel to achieve better peeling results. A segmented roller with segments of a first diameter near the entrance of the peeler and segments of a second greater diameter near the exit end could be used to form upper and lower peeler sections as in conventional peelers. Clearly, segmented peeler rollers allow a variety of custom roller configurations to match the rollers to the product characteristics for better peeling results.

In another version of a peeling apparatus, a cover plate between the drive system and the peeling roller separates the peeling area from the drive. Openings in the cover plate for the roller assemblies include seals to keep shrimp juices and other debris out of the drive system.

BRIEF DESCRIPTION OF THE DRAWINGS

These and other features, aspects, and advantages of the invention are described in more detail in the following descriptions, appended claims, and accompanying drawings in which:

FIG. 8 is a perspective view of another version of a shrimp peeling apparatus embodying features of the invention;

DESCRIPTION OF PREFERRED EMBODIMENTS

Figure 1:
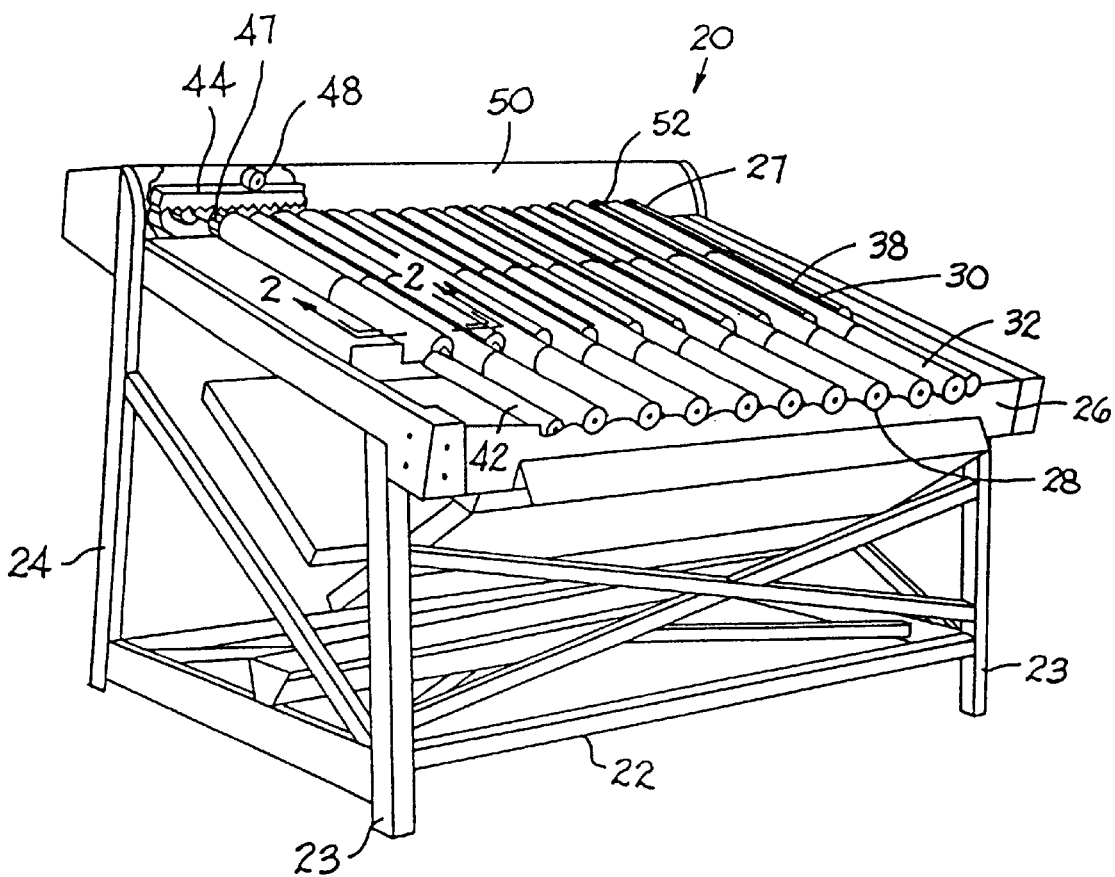
FIG. 1 is a perspective view, partly cut away, of a shrimp peeling apparatus embodying features of the invention.

An exemplary version of a peeling apparatus embodying features of the invention is shown in FIG. 1. The peeling apparatus 20, which is typically used to peel shrimp, includes a frame 22 consisting of front and rear legs 23, 24 forming a framework with various cross-bracing and support members. A bed 26 supports peeling rollers that slope downward from a first product-entrance end 27 to a second product-exit end 28. (To simplify the drawing, a finger frame, typically used to urge shrimp into peeling positions, is not shown.) The rollers shown in FIG. 1 include two kinds of powered roller assemblies—channel-forming roller assemblies 30 and lower power roller assemblies 32. In an upper peeling portion of the peeling apparatus, a plurality of side-by-side peeling channels are formed by a roller assembly arrangement shown in FIG. 2. In the arrangement, a peeling channel is formed by a lower roller assembly 32 flanked by two channel-forming roller assemblies 30. All three roller assemblies are powered directly by the peeling apparatus's drive system. Each of these roller assemblies is made of a tube 34, typically steel, coated with a coating 35, such as a rubber-like material, to form an outer peeling surface 36. The coating could be a polyurethane, as well as other synthetic or natural materials, to provide the peeling effectiveness or durability required by the application. The coating could be left off and the uncoated tube constructed entirely of stainless steel, for instance, with or without a knurled, sandblasted, or otherwise textured surface. The upper peeling channels are further formed by narrow-diameter insert rollers 38 held down into the crotches between the lower and channel-forming rollers. The insert rollers rotate by contact with the powered rollers, which are driven alternately clockwise and counterclockwise by the drive system. The insert rollers are typically made of stainless steel with or without surface texturing. The insert rollers are encircled at various positions along the channel by straps 40. The straps, which are attached to the frame, are tensioned by springs, for example, to pull the insert rollers down into the crotches to form peeling nips with the lower roller assembly.

A lower peeling portion of the peeling apparatus is formed by the lower power roller assemblies 32 supported on idler rollers 42. The channel-forming roller assemblies 30 and the insert rollers 38 do not extend down into this lower peeling portion of the apparatus. The peeling nip formed in the lower peeling section produces a peeling action different from that in the upper peeling section. Subjecting product to be peeled, such as shrimp, to both kinds of peeling action produces a more effectively peeled product.

Both the channel-forming roller assemblies 30 and the lower power roller assemblies 32 are powered at the upper end of the peeling apparatus. A drive system comprising, for example, a rack gear 44 linked to a crank and a pitman arm driven by a motor (not shown) is used to reciprocate the rack gear. A drive member 46, including a toothed gear wheel 47 in FIG. 1, connected at a first end of each of the powered roller assemblies, meshes with the rack gear. As the rack gear reciprocates, the powered roller assemblies rotate clockwise and counterclockwise in synchrony with the rack. Idler wheels 48, in rolling contact with the upper surface of the rack, retain it in position. A cover plate 50 at the first upper end of the powered roller assemblies separates the drive system from the peeling channels. Openings 52 formed in the plate admit the drive member portion of the powered roller assemblies into an engagement position with the drive system of the peeling apparatus.

Figure 2:
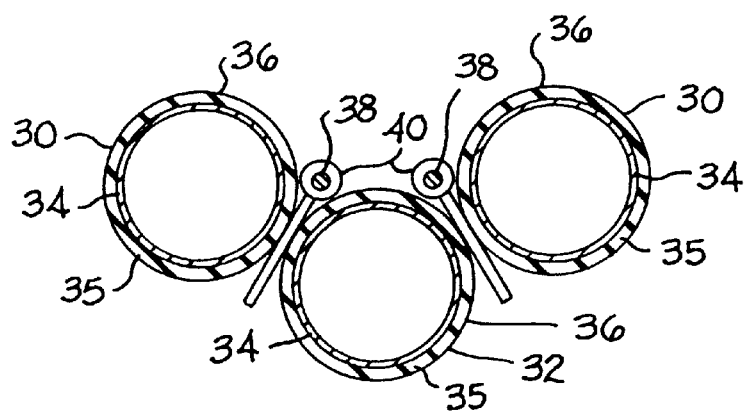
FIG. 2 is a cross-sectional view of one channel of rollers taken along cut line 2—2 of FIG. 1.
Figure 3:
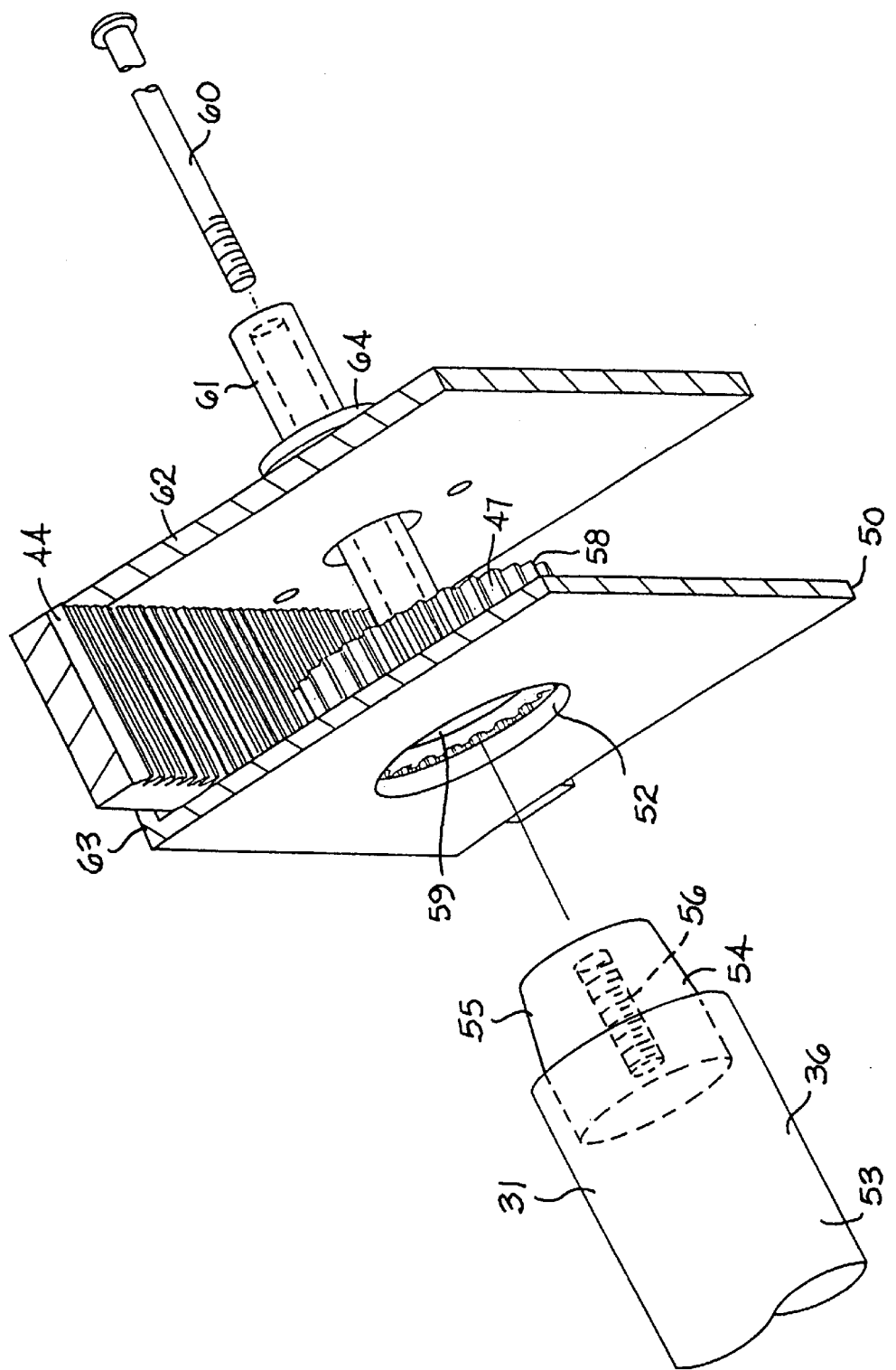
FIG. 3 is an exploded partial perspective view illustrating a releasable connection between a peeling roller and a drive member for a peeling apparatus as in FIG. 1.

More details of the cover plate, the drive system, and the powered roller assemblies are shown in FIG. 3. The roller assembly 31, which could be either the channel-forming roller assembly 30 or the lower power roller 32 of FIGS. 1 and 2, is divided into a generally cylindrical roller 53 with an outer surface 36 for engaging product to be peeled. Roller connection structure at one end is formed by an end plug 54 with an axial threaded bore 56. Extending outward from the roller, the connection structure 55 is preferably tapered with, for example, a frustoconical shape. The plug is press-fit into the hollow roller 53 or otherwise permanently or semi-permanently attached. The roller assembly further includes a drive member 58 with drive connection structure in the form of a mating receptacle 59 having a shape complementary to the shape of the roller connection structure. A drive member shaft 61 with a hollow bore extends from the receptacle end of the drive member opposite the roller through a back plate 62. The shaft is supported by a bearing block 64 mounted to the rear of the back plate. Adjustment element 60, in the form of a bolt, extends through the bore of the drive member into the threaded axial bore of the roller plug. Tightening the bolt pulls the frustoconical extension deeper into the receptacle to make a firm connection capable of transmitting rotational power to the roller. The connection can be easily released by loosening the bolt to separate the drive member from the roller. The drive member shown in FIG. 3 includes a gear wheel 47 that engages the rack gear 44. The gears are shown encased in a housing formed by a back plate 62, a top plate 63, and a cover plate 50. The opening 52 admits the connection between the roller and the drive member with the cover plate separating the peeling portion of the peeling apparatus from the drive system.

Figure 4:
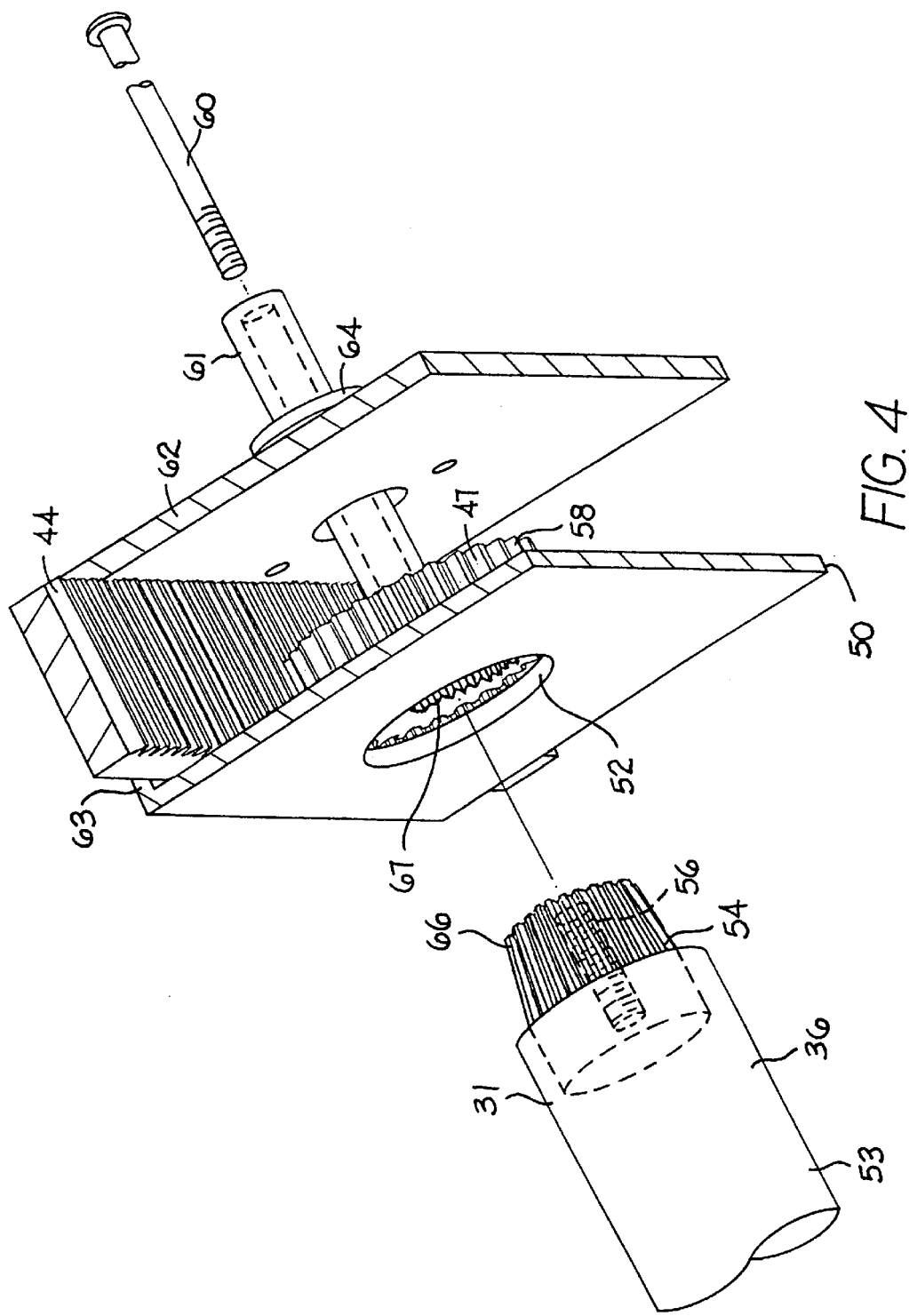
FIG. 4 is an exploded partial perspective view of another version of a releasable connection as in FIG. 3.

Another version of the connection of the roller to the drive member is shown in FIG. 4 in which the plug 54 includes a tapered roller connection structure with splines 66. The splined structure mates with a splined receptacle 67 forming the drive connection structure in the drive member. The splines provide an even more secure connection and better drive transmission than the unsplined taper lock connection of FIG. 3.

Figure 7:
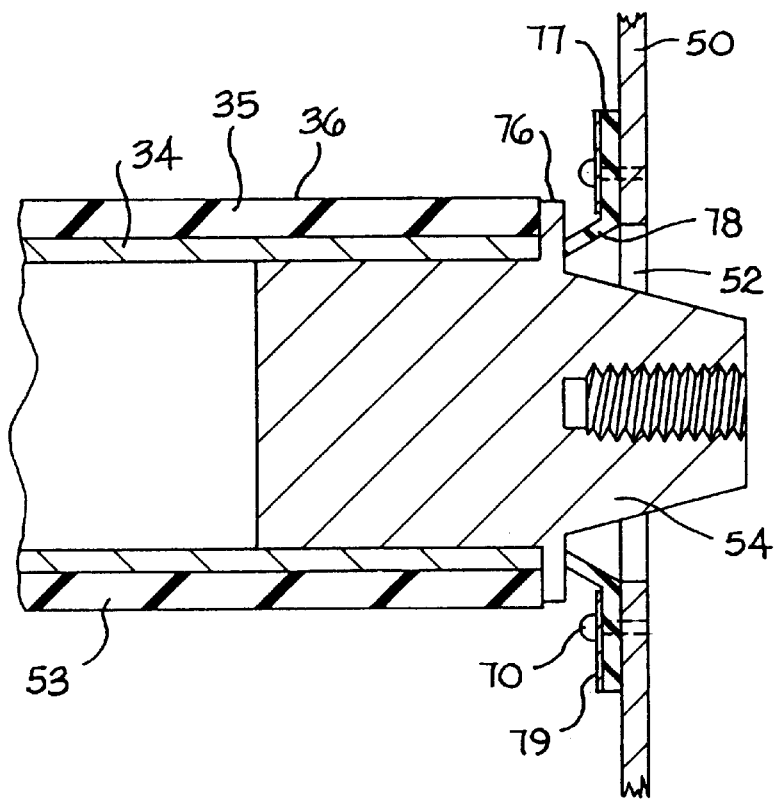
FIG. 7 is a cross-sectional view as in FIG. 5 of yet another version of a seal.
Figure 5:
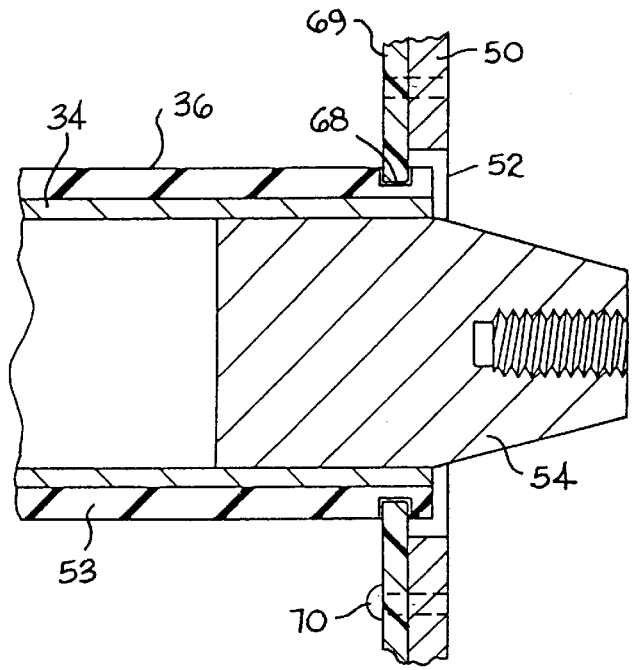
FIG. 5 is a cross-sectional view of one version of a seal formed between a peeling roller and a cover plate for a drive system for a peeling apparatus as in FIG. 1.
Figure 6:
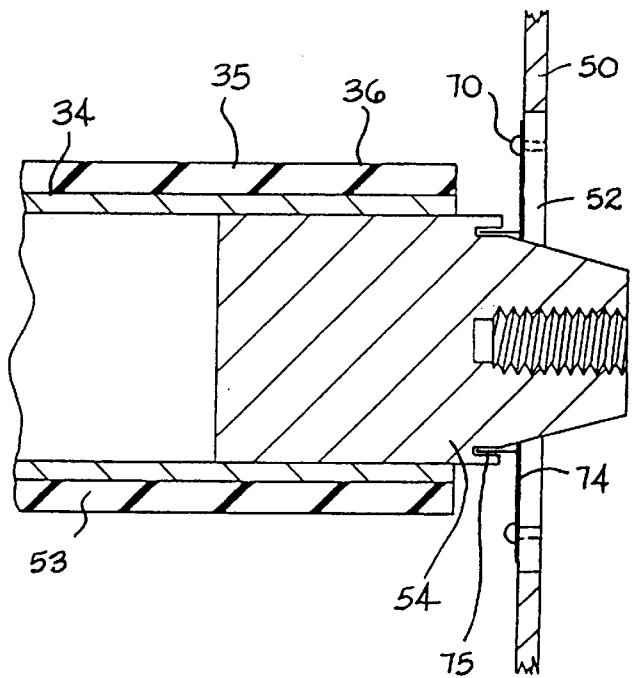
FIG. 6 is a cross-sectional view as in FIG. 5 of another version of a seal.

To prevent slime and other juices from infiltrating the drive system, seals, as shown in FIGS. 5–7 can be used. The version in FIG. 5 uses a groove seal in which the outer peeling surface of the roller 53 has a circumferential groove 68 formed near the plug end of the roller. A flexible seal 69 in the form of a sheet made of a suitable rubber or rubber-like material is attached to the outside of the cover plate 50 by suitable fasteners, such as rivets 70. The sheet has a circular opening whose diameter is less than the outside diameter of the roller 53, but less than the distance between diametrical opposite positions on the base of the groove. In that way the seal fits in the groove, and any fluids passing from one side of the seal to the other must follow a circuitous path.

Another version of a seal is shown in FIG. 6, in which the end plug 54 has a circular plug groove 72 formed in its face. A rubber or rubber-like labyrinth seal 74 affixed to the front of the rear plate 50 by rivets 70 includes a tubular projection 75 that extends into the circular groove. The resulting seal prevents the passage of contaminants across its boundary.

Yet another version of seal is illustrated in FIG. 7. The plug 54 includes a circular flange 76 abutting the plug end of the roller 53. A lip seal 77 has a frustoconical lip 78 that bears on the flange when the roller is connected to the drive member through the opening 52 in the cover plate 50. The lip seal includes a metal reinforcing strip 79 for the attachment rivet. Such a reinforcing strip could be used with the other seals described. As these examples suggest, there are many ways of sealing the peeling section of the peeling apparatus from the drive system.

Figure 14:
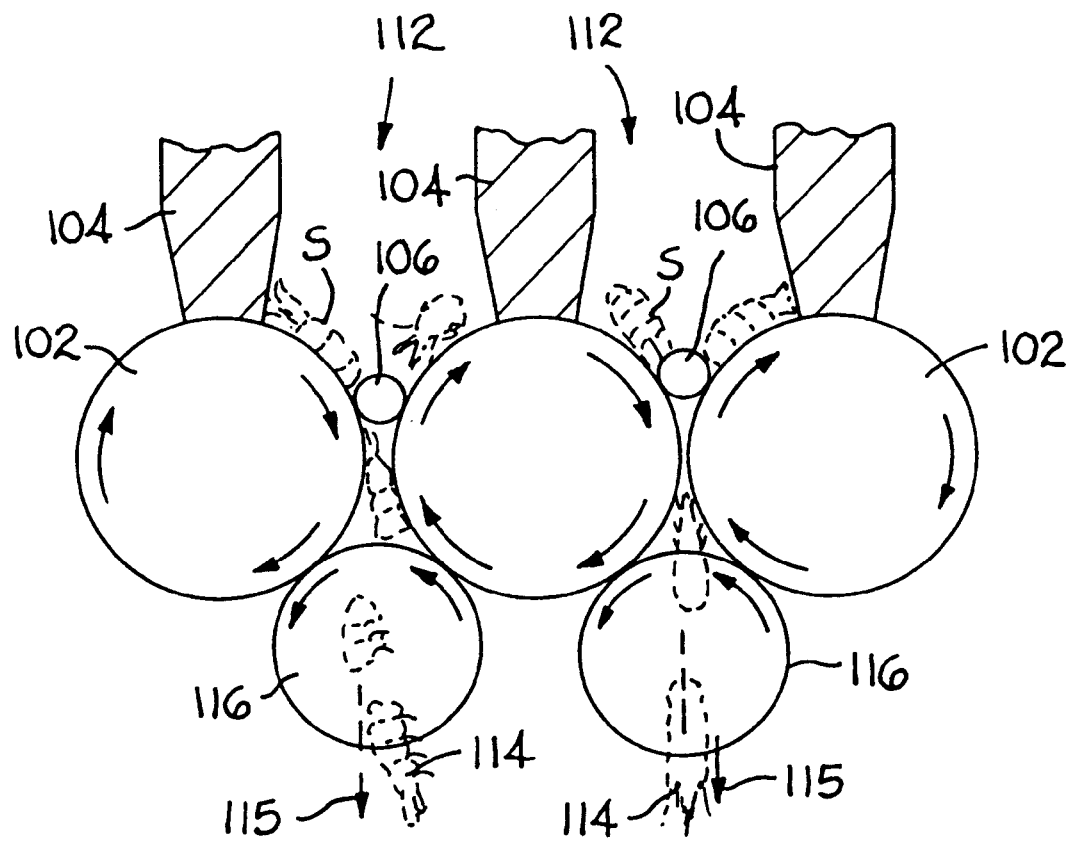
FIG. 14 is an end-on cross section of two peeling channels of a peeling apparatus as in FIG. 8.

Another version of a peeling apparatus embodying features of the invention is shown in FIG. 8. The peeling apparatus 100 differs structurally from the apparatus 20 of FIG. 1 primarily in that peeling channels are formed not by lower power rollers flanked by channel-forming rollers, but by a planar array of powered roller assemblies 102 and channel dividers 104 resting atop the powered rollers along their lengths. This arrangement is illustrated in FIG. 14, which also shows insert rollers 106 held down into the crotches between adjacent powered rollers 102 by conventional holddown straps (not shown) attached to the frame 108. The dividers 104 supported from above by cross members 110 rest on or just slightly above each powered roller to divide the peeling section of the peeling apparatus into individual channels 112. Shrimp S ride down the roller channels as the power rollers rotate alternately clockwise, as indicated by the arrows in FIG. 14, and counterclockwise. The alternating rotation first pulls the shrimp into the peeling nip formed between the insert rollers and powered rollers where its shell is unwrapped. Then the shrimp is released and reoriented before being pulled back into the nip. Unwrapped shells 114, heads, and other inedible shrimp appendages slip between the rollers and drop downward in the direction of arrow 115 to be discarded. The powered rollers are supported at a position along their lengths by idler support rollers 116, which rotate opposite to the powered rollers because they are driven by the powered rollers resting on them.

As shown in FIG. 8, the peeling apparatus 100 is supported by the frame 108. The powered rollers extend from an upper entrance end 118 elevated with respect to a lower exit end 119. The powered rollers have vertical play at the lower end to avoid jamming, but upward motion is constrained by an array of passive rollers 120 disposed just above the powered rollers at the lower end of the peeling apparatus. A network of spray nozzles 122 and water pipes 123 spray water into the peeling channels to remove slime from the roller surfaces and to urge the shrimp along the downwardly sloped channels.

Figure 9:
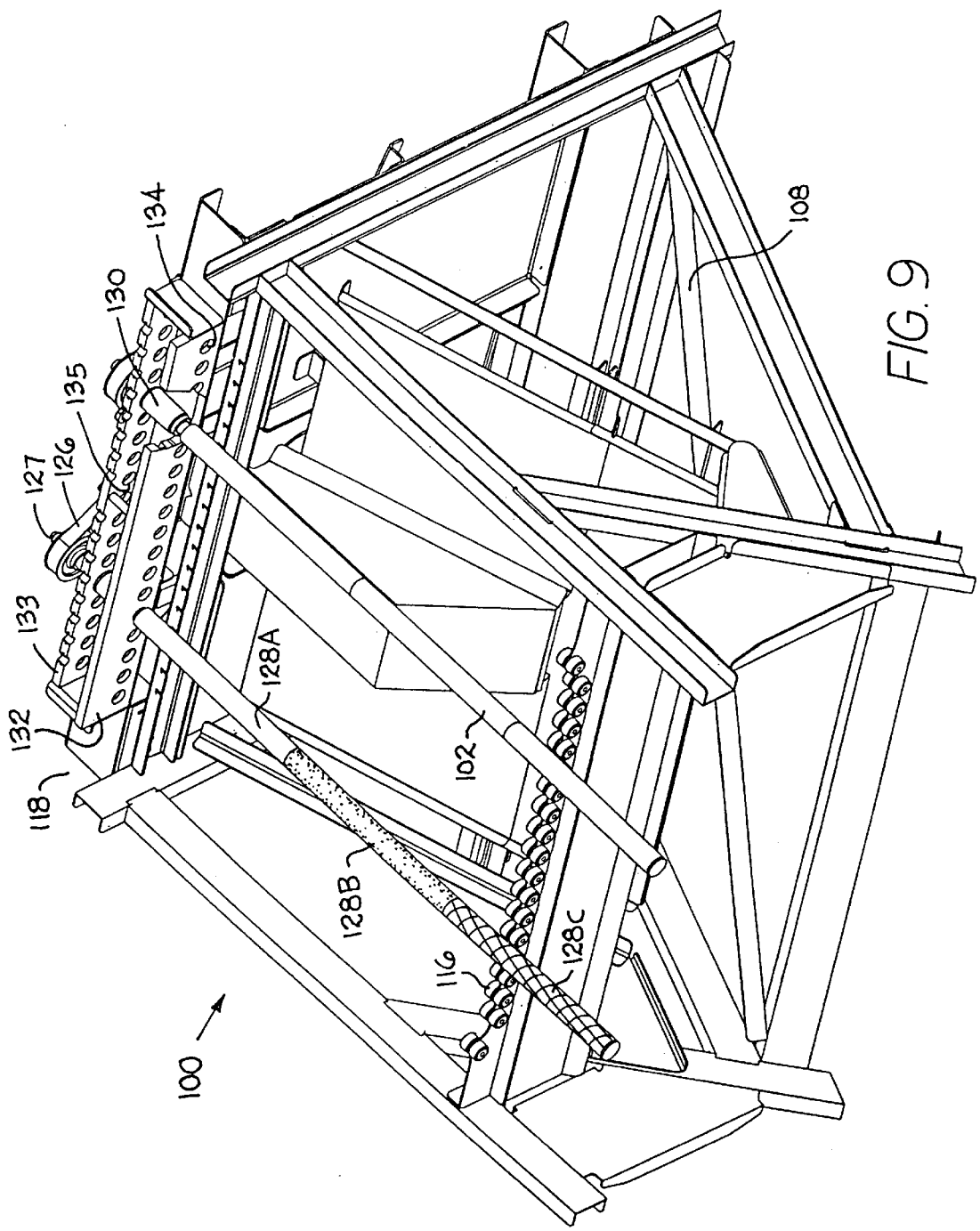
FIG. 9 is a perspective view of a shrimp peeling apparatus as in FIG. 8 with a cut-away portion and some parts removed to simplify the drawing.
Figure 10:
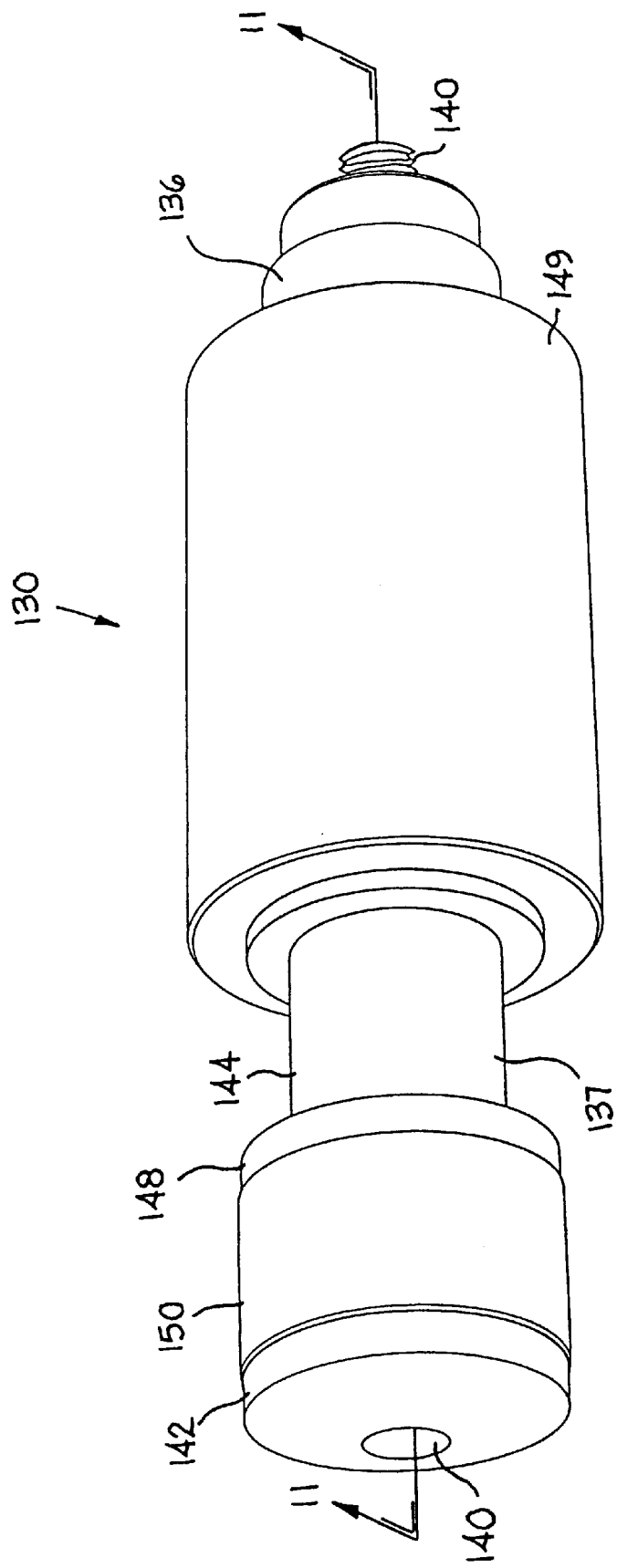
FIG. 10 is a perspective view of a drive member for a roller assembly usable with the peeling apparatus of FIG. 8.
Figure 11:
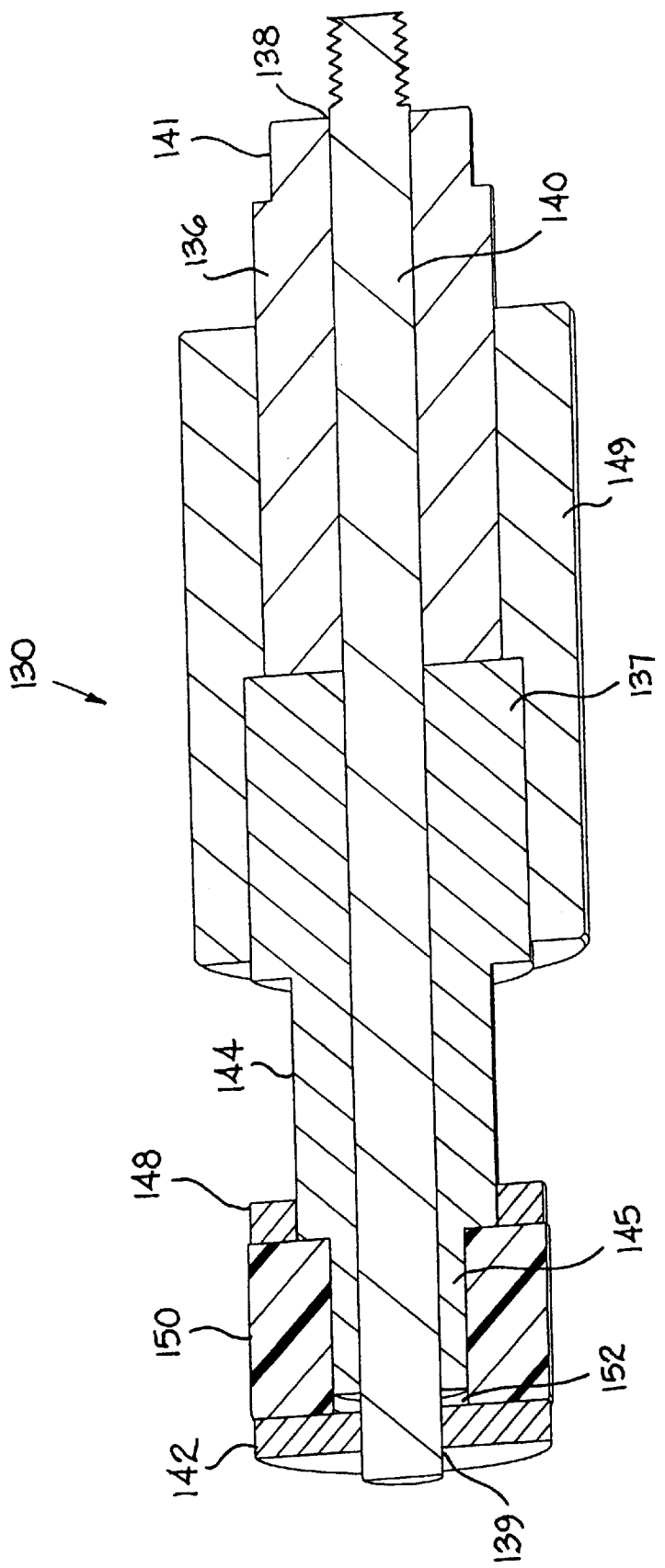
FIG. 11 is a perspective cross-section of the drive member of FIG. 10 taken along cut line 11—11.
Figure 12:
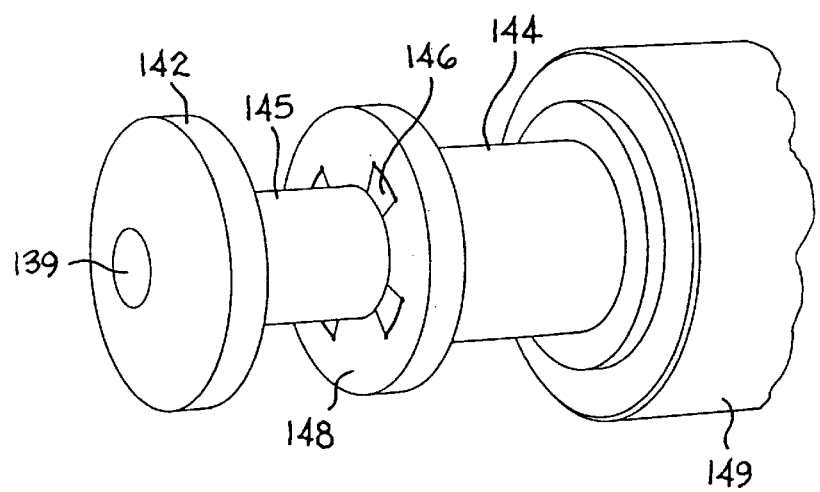
FIG. 12 is a partial perspective view of the drive member of FIG. 10 with the compression element removed.

Further details of the powered roller assembly 102 are shown in FIG. 9, in which a pair of roller assemblies 102 is shown supported by the frame 108 for simplicity. The roller assembly is powered by a drive system 124 comprising a motor, belts 126, pulleys 127, and tensioners. The belts are preferably timing-type belts and the pulleys correspondingly toothed to mesh with teeth on the belts. The powered roller assembly includes one or more roller segments 128A–C joined together. The roller assembly also includes a drive member 130 engaged by the drive system. The drive member is connected to the roller segment nearest the entrance end 118 of the peeling apparatus. A cover plate 132 has a row of openings 134 with bearings for the powered roller assemblies. A rear plate 133 has openings 135 with bearings for the drive members. The cover plate provides bearing support for the roller assemblies and also shields the drive system from splashing debris from the peeling section. The outer peeling surfaces of the roller segments 128A–C may be made of different materials or otherwise textured differently. For example, roller segment 128A may be a rubber-surfaced roller while segment 128B is sandblasted stainless steel, and roller segment 128C is knurled stainless steel. Because the roller is made up of segments, many combinations of roller segment surface characteristics can be formed to optimize peeling performance.

The drive member 130, shown in more detail in FIGS. 10–13, includes a hollow input shaft 136 abutting a similarly hollow output shaft 137. The input shaft has a narrow portion 141 acting as a bearing surface supported by a rear bearing in the rear plate openings 135 of the peeling apparatus. The two shafts are preferably separate pieces of metal, but could be all one piece. Each shaft could also be separated into individual pieces. Bores 138, 139 through the shafts are aligned to admit an adjustment element such as a rod 140 threaded at one end. The other end of the rod is affixed, such as by welding, to a first compression washer 142. The output shaft 137 includes a large diameter portion 144 and a narrow diameter portion 145. The large diameter portion rests on a bearing in the opening 134 of the cover plate of the peeling apparatus. Circumferential slots formed at an end of the large diameter portion of the output shaft are separated by teeth 146. A toothed washer 148 interfits with the slots and teeth of the larger diameter portion on which it is supported. A compression element 150, such as an annulus made out of a flexible polymeric material, fits around the narrow diameter portion 145 of the output shaft between the compression washer 142 and the toothed washer 148. In the compression element's relaxed state, its outside diameter is about the same as the outside diameters of the two washers. A small gap 152 exists between the relaxed compression element, the inside of the compression washer, and the outer end of the output shaft. An elongated pulley 149, preferably toothed, is coaxially affixed to the shafts 136, 137. The elongated pulley accommodates one or more belts, preferably toothed timing belts.

Figure 13A:
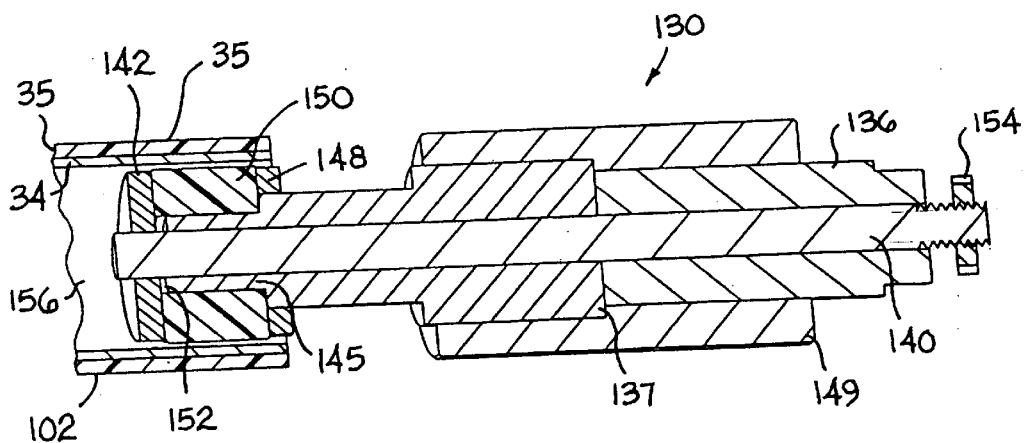
FIG. 13A is a partial side elevation cross-section of the connection between the drive member of FIG. 10 and a roller portion of a power roller assembly usable with the peeling apparatus of FIG. 8, in which the connection is unmade.
Figure 13B:
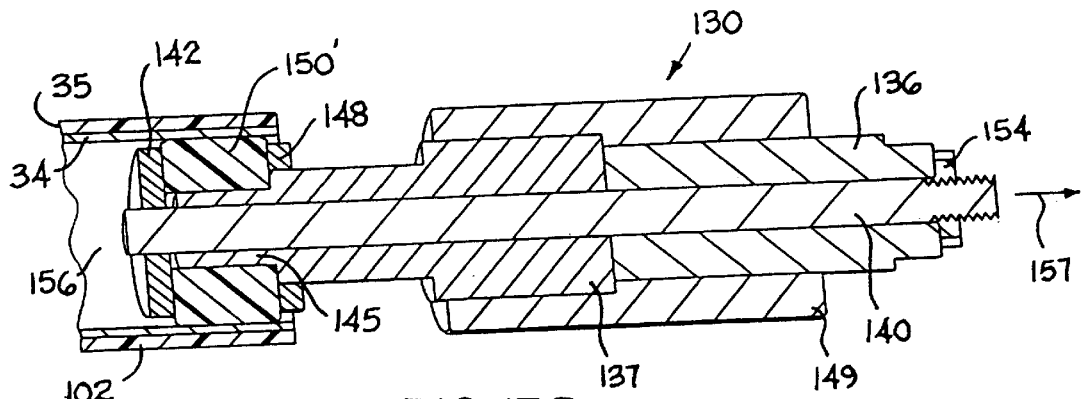
FIG. 13B is a cross-section as in FIG. 13A, but with the connection made.

The connection between the roller portion and the drive member of the roller assembly is illustrated in FIGS. 13A–B. The connection is unmade in FIG. 13A. Adjustment nut 154 is shown loosened on the threaded end of the adjustment rod 140. The loosened nut allows the compression element to relax to its natural shape 150. The inner tube 34 of the roller segment, which may or may not be coated on its outside with a coating 35, forms a cylindrical opening to receive the drive member connection structure made up of the compression element and washers. The opening forms a wall 156 along its inner diameter, which is greater than the outside diameter of the relaxed compression element. For this reason, the roller assembly 102 can be easily separated between the drive member and the roller when the adjustment nut is loosened.

When the nut is tightened against the input shaft 136 as in FIG. 13B, the rod 140 pulls the affixed compression washer 142 against the compression element in the direction of arrow 157. Confined between the compression washer and the toothed washer 148, the outer diameter of the compression element increases as its length is compressed. When the nut is tightened, the compressed compression element 150' engages the wall of the roller in frictional contact to retain the drive member securely to the roller. Thus, to replace worn rollers, the roller assembly can be easily separated into a roller portion and a drive member without disengaging the drive member from the drive systems. Reconnection is similarly simplified.

Figure 15:
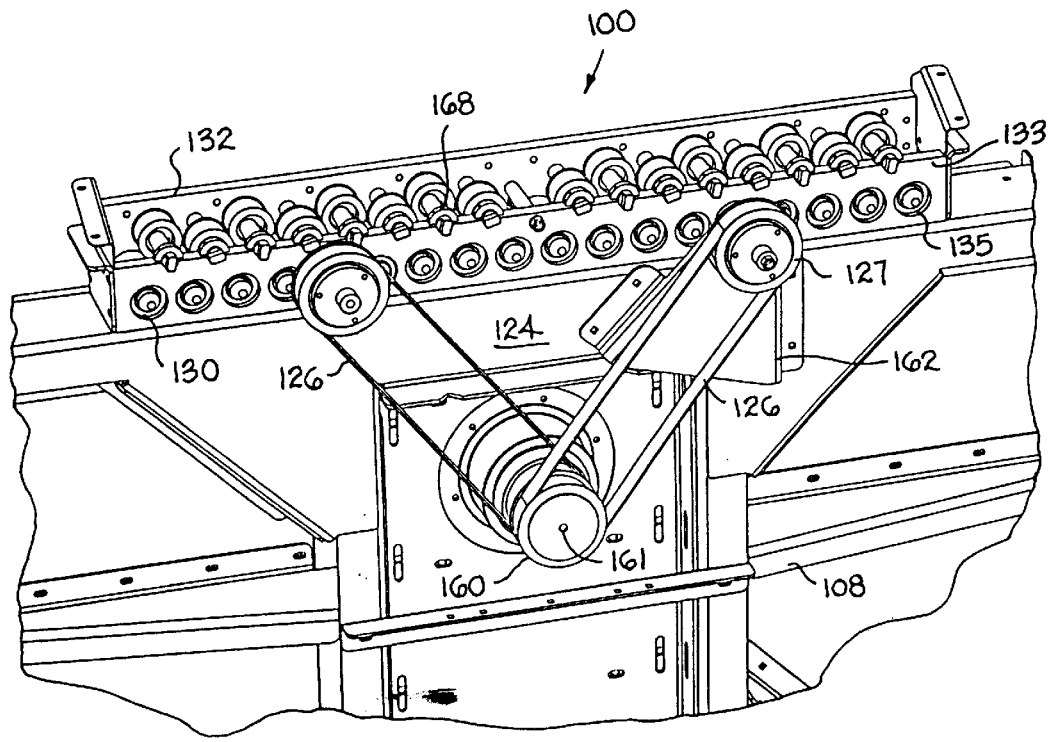
FIG. 15 is a partial rear perspective view of some of the features of the drive system of FIG. 8.
Figure 16:
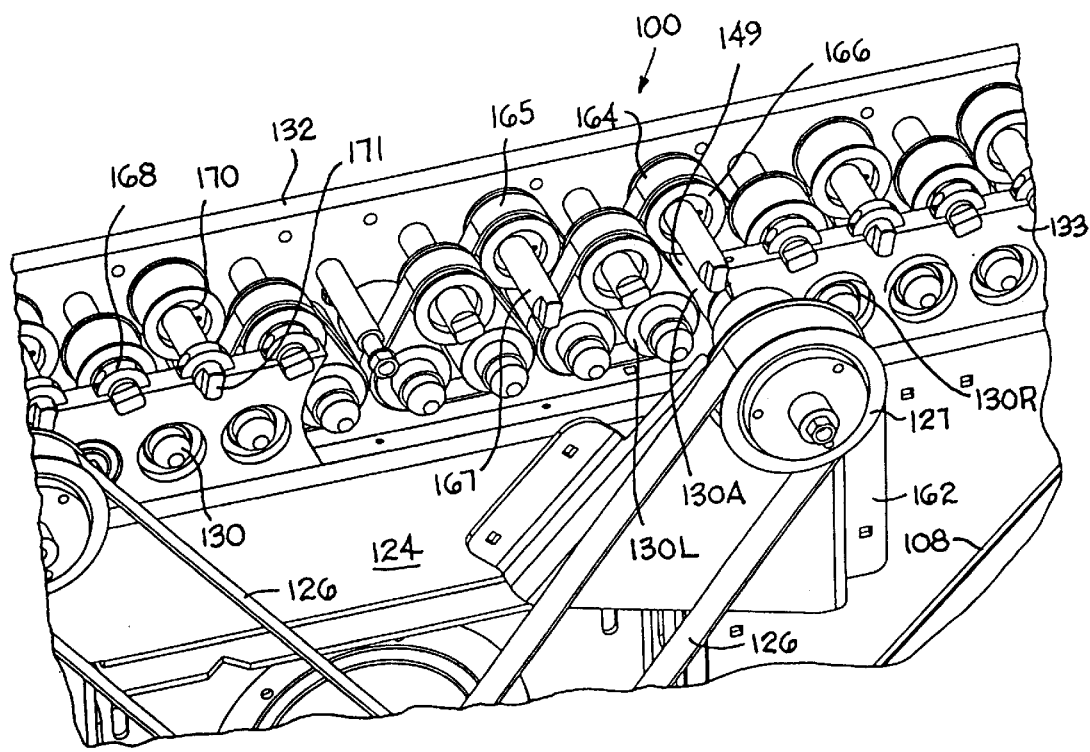
FIG. 16 is a partial rear overhead perspective view of a portion of the drive system of FIG. 15 with a part of the rear plate cut away.

The connection of the drive system 124 to each drive member 130 is shown in more detail in FIGS. 15 and 16. A motor (not shown) is supported in the framework 108. A pulley assembly 160, which may include one or more pulleys, is arranged on the motor's drive shaft 161. Each main drive belt 126 wraps around the pulley assembly and one of the pulley wheels 127 attached to the input shaft of the drive members 130. A pulley support bracket 162 (shown with only one of the pulley wheels for simplicity) is attached to the frame to support the pulley 127. In this example, two main drive belts 126 are shown, but one or more belts with one or more pulley wheels could alternatively be used. With two main drive belts, the drive members are divided into two groups, each driven by one of the main drive belts 127 through one of the pulley wheels 127. A central drive member 130A in each group is connected directly to one of the pulley wheels. The central drive member's elongated pulley 149 engages two small belts 164, 165 that drive flanking drive members 130L and 130R. (The belt driving the drive member 130R is not shown, but operates just as the belt 164 does for the left-side flanking drive members, except that it resides on the elongated pulley of drive member 130A closer to the pulley wheel 127.) The belt 164 wraps around the elongated pulleys of central drive member 130A and neighboring drive member 130L. A tensioner pulley 166 positioned above and between the adjacent drive members is used to take up any slack in the belt. The tensioner pulley is mounted on a tensioning shaft 167, which is supported between the front plate 132 and the back plate 133. Half collars 168, whose ends bolt to the back plate, confine the ends of the tensioner shafts in place atop the upper edge of the back plate. An eccentric journal 170 is attached to each tensioning shaft. A thin-sleeved polymer journal bearing is pressed into the bore of each tensioner pulley so that each pulley is fully rotatable about the eccentric journal. In this way, by using a wrench, for example, to rotate an end 171 of each tensioner shaft, one can independently and easily adjust the tension in each of the short belts 164, 165. Each elongated pulley accommodates two short belts. Only the outermost drive members of each group have only one belt. Each belt is wrapped around a separate tensioner pulley and a neighboring drive member in a triangular configuration that transfers drive power from the central drive member outward through the flanking drive members. Thus, the elongated pulley of each drive member receives power from the short belt wrapped around its neighbor nearer the central drive member and transmits power through the short belt wrapped around its outward neighbor. Of course, belts wrapped around the elongated pulley of the central drive member each transmit power. The tensioner pulleys 166 are staggered front to back to accommodate forwardly- or rearwardly-arranged short belts.

Figure 17:
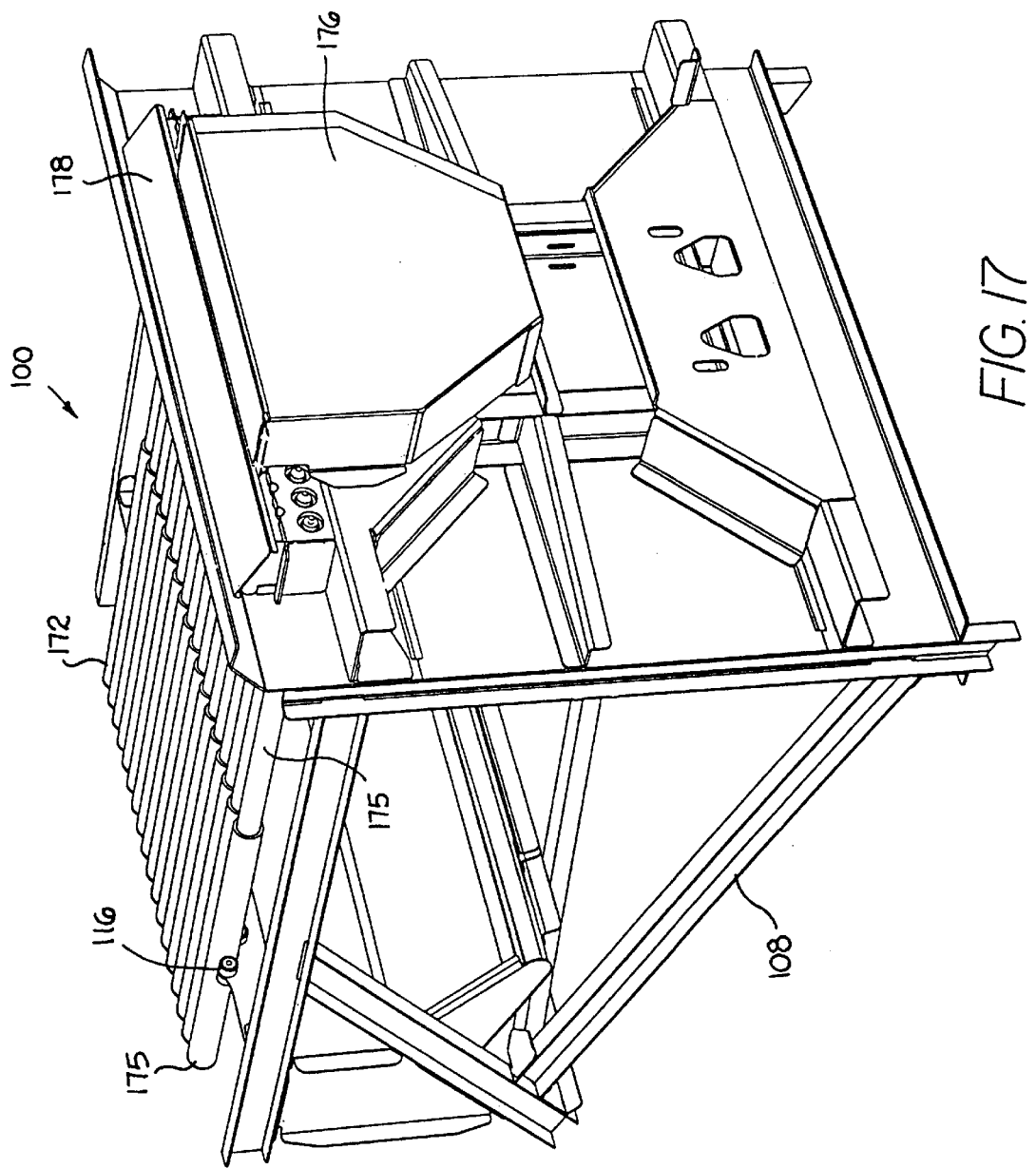
FIG. 17 is a rear perspective view of a shrimp peeling apparatus as in FIG. 8 having rollers with segments of different diameters.

Another roller arrangement for a peeling apparatus is shown in FIG. 17. In this arrangement, segmented rollers 172 have an upper portion 174 of a smaller diameter than the lower portion 175. Such an arrangement can be used to simulate the peeling characteristics of the peeler of FIG. 1 with a single array of driven roller assemblies.

The peeling apparatus 100 includes a drive cover 176 to help protect the drive system from debris and saltwater that tend to drop from the shrimp as they are introduced into the peeling channels. Likewise, the drive members are covered by a lid 178.

Figure 18:
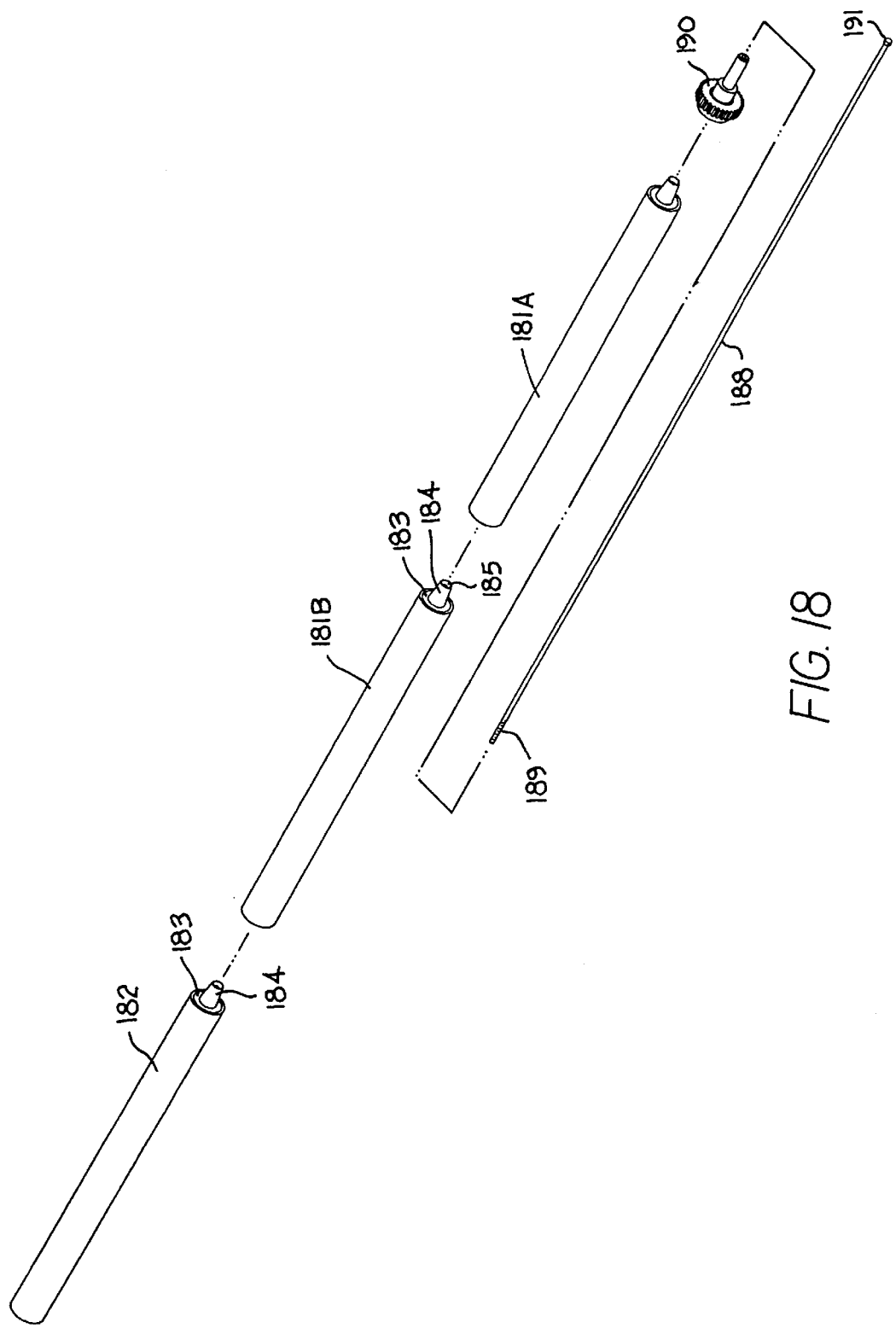
FIG. 18 is an exploded view of a segmented roller assembly for a peeling apparatus according to the invention.
Figure 19:
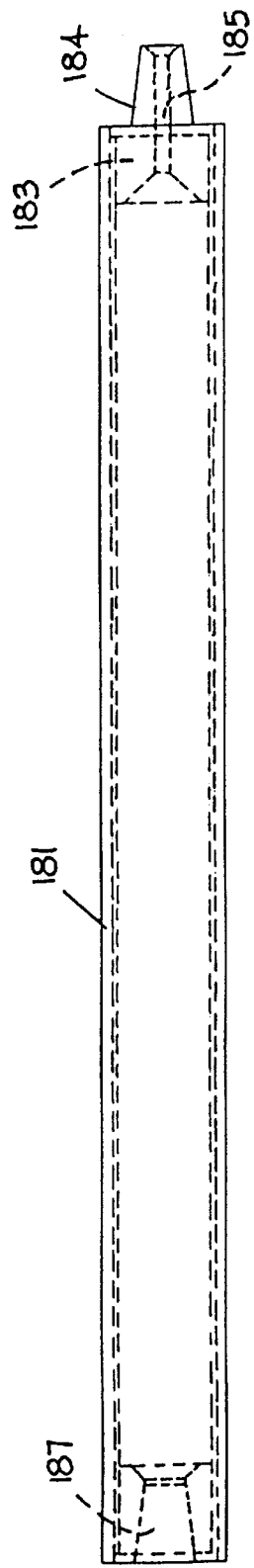
FIG. 19 is a side view of an upper roller segment of the segmented roller assembly of FIG. 18.
Figure 20:
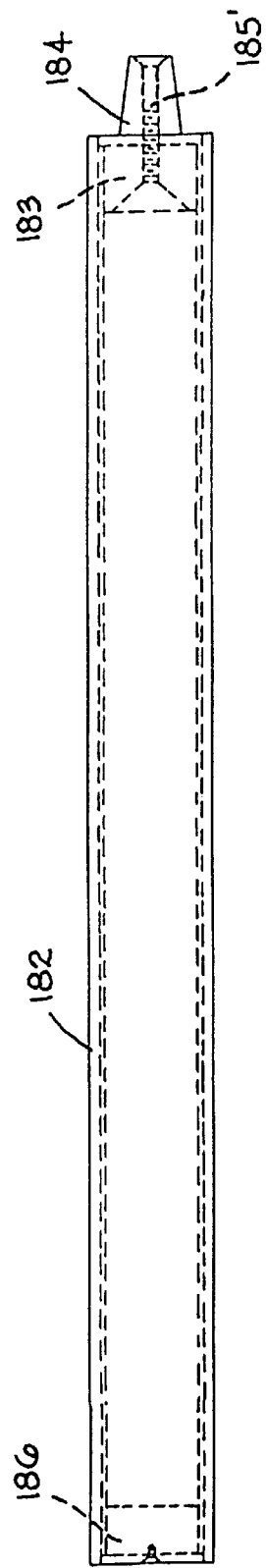
FIG. 20 is a side view of the lower roller segment of the roller assembly of FIG. 18.

A three-segment roller 180 is shown in FIG. 18, with individual roller segments shown in FIGS. 19 and 20. The roller includes two identical upper segments 181A, B and a bottom segment 182. Extending from an end of each of the segments 181, 182 is a taper-lock connection structure in the form of an end plug 183 and a tapered outwardly extending portion 184. A bore 185 extends through the connection structure. The bore 185 through the upper roller segments 181 is an unthreaded clearance hole; the bore 185' through the bottom roller segment 182 is threaded along at least part of its length. The bottom roller segment is terminated in an end cap 186 pressed into its bottom end. A receptacle 187 at the end of the upper roller segments 181 opposite the outwardly extending connection structure is shaped to mate with the outwardly extending connection structure of a consecutive roller segment in a taper-lock engagement. A long rod 188 threaded at one end 189 extends through a drive member 190 and the roller segments. The threaded end 189 of the rod engages the threaded bore 185' in the lower roller segment 182. Tightening the rod with a wrench at its head 191 holds the roller segments together and to the drive member to form a roller assembly. The inter-segment connections are secure taper-lock connections. The connecting structure extending from the uppermost roller segment mates with a reciprocal receptacle in the drive member. This connection arrangement is secure and allows for the easy replacement of worn segments by loosening the rod. Equivalently, the end cap could include an open bore and the drive member could include a threaded bore so that the rod or equivalent adjustment element could be inserted from the opposite end of the roller assembly. While the taper-lock attachment is a preferred method of holding the assembly together, other connections, such as those mentioned in respect to the connections between the rollers and the drive members, are possible.

Thus, the roller assemblies described have a releasable connection between the peeling roller and the drive member for easy manufacture, installation, and replacement. The roller assemblies themselves can be composed of multiple segments held together by a similar releasable connection to provide for easy storage of shorter roller segments and the customizing of a roller with different peeling surfaces or diameters along its length.

Although the invention has been described in detail with respect to a few preferred versions, other versions are possible. For example, various ways of attaching roller segments to each other and to a drive member can be devised without departing from the spirit of the invention. Therefore, the scope of the claims should not be limited to the description of the preferred versions.

What is claimed is:

1. A powered roller assembly for a product-peeling machine driven by a drive system, the powered roller assembly comprising:

a generally cylindrical roller including an outer surface for engaging product to be peeled and roller connection structure at one end;

a drive member drivingly engaged by the drive system and including drive connection structure for mating with the roller connection structure to form a connection between the drive member and the roller capable of transmitting power from the drive system to the roller; and an adjustment element extending through the drive member to the connection for making and breaking the connection between the roller and the drive member so that the roller can be readily separated and reattached to the drive member.

2. A powered roller assembly as in claim 1 wherein the roller connection structure comprises an axial opening circumscribed by a wall and wherein the drive connection structure comprises a compression element that fits in the opening, wherein the compression element, when compressed by tightening the adjustment element, frictionally engages the wall to retain the drive member to the roller and wherein the compression element, when uncompressed by loosening the adjustment element, releases the frictional engagement with the wall to allow the roller to readily separate from the drive member.

3. A powered roller assembly as in claim 2 wherein the drive member comprises a first compression washer attached to an end of the adjustment element, a hollow shaft admitting the adjustment element therethrough, and a second compression washer around the hollow shaft, and wherein the compression element is cylindrically shaped with an axial bore surrounding an end portion of the hollow shaft between the first and second compression washers, which press against the compression element as the adjustment element is tightened, flattening the compression element axially and expanding its circumference to frictionally engage the wall of the roller.

4. A powered roller assembly as in claim 1 wherein the roller connection structure includes a frustoconical extension and wherein the drive member connection structure includes a receptacle that mates with the frustoconical extension and wherein the adjustment element extends through the drive member into the roller connection structure to press the frustoconical extension tightly into the mating receptacle as the adjustment element is tightened.

5. A powered roller assembly as in claim 4 wherein the frustoconical extension includes an axial threaded bore and wherein the drive member includes an axial passage that aligns with the bore of the frustoconical extension and wherein the adjustment element comprises a bolt extending through the axial passage and into the threaded bore, whereby the connection between the roller and the drive member can be adjusted or released by tightening and loosening the bolt.

6. A powered roller assembly as in claim 1 wherein the roller includes a tapered roller connection structure, the tapered roller connection structure including a plurality of splines, and wherein the drive member includes a mating tapered drive connection structure, the mating tapered connection structure further including splines for meshing with the splines of the tapered roller connection structure.

7. A powered roller assembly as in claim 1 wherein the roller comprises a series of axially connected roller segments.

8. A powered roller assembly as in claim 7 wherein the axially connected roller segments include at least one segment with a diameter that is different from that of another segment.

9. A powered roller assembly as in claim 7 wherein the axially connected roller segments include at least one segment with an outer surface textured differently from that of another segment.

10. A peeling apparatus comprising:
a frame;
a plurality of powered roller assemblies supported side-by-side in the frame, each powered roller assembly including a peeling roller having roller connection structure at a first end, a drive member having drive connection structure for mating with the roller connection structure to form a connection between the drive member and the first end of the roller;
an adjustment element extending through the drive member to allow the connection to be released; and
a drive system supported by the frame, the drive system drivingly engaging the drive members to transmit power through the connection to rotate the peeling rollers.

11. A peeling apparatus as in claim 10 further comprising a plate at the first end of the peeling rollers, the plate forming openings to admit the roller assemblies, and a seal at each opening to form a seal around the roller assembly extending through the opening, the plate separating the peeling rollers from the drive members.

12. A peeling apparatus as in claim 10 wherein each peeling roller includes a peeling portion along most of its length and the peeling apparatus further comprises a plate with an opening therethrough at the first end of each peeling roller, the roller connection structure extending through the opening in the plate to mate with the drive connection structure, wherein the plate separates the peeling portions of the peeling roller from the drive members.

13. A peeling apparatus as in claim 10 wherein each drive member includes teeth for engaging the drive system and the peeling apparatus further comprises a pair of bearings flanking the teeth and supporting the drive member.

14. A peeling apparatus as in claim 10 wherein each peeling roller includes a peeling portion extending substantially from the first and to a second end of the roller and wherein the peeling portion comprises a series of axially connected roller segments.

15. A peeling apparatus as in claim 14 further comprising releasable connections between consecutive segments.

16. A peeling apparatus as in claim 10 wherein the roller connection structure includes an axial opening circumscribed by a wall and wherein the drive connection structure comprises a compression element that fits in the opening, wherein the compression element, when compressed, frictionally engages the wall to retain the drive member to the peeling roller and wherein the compression element, when uncompressed, releases the frictional engagement with the wall to allow the peeling roller to separate readily from the drive member.

17. A peeling apparatus comprising:
a frame;
a plurality of powered roller assemblies supported side-by-side in the frame, each powered roller assembly including a roller, a drive member, and a connection between the drive member and a first end of the roller, wherein each roller includes a segmented cylindrical peeling portion extending from a first end of the roller to a second end at a lower elevation than the first end, each segmented peeling portion having an outer peeling surface; and
a drive system supported by the frame, the drive system drivingly engaging the drive members to transmit power through the connection to rotate the rollers.

18. A peeling apparatus as in claim 17 wherein the connection between the drive member and the first end of the roller is a releasable connection.

19. A peeling apparatus as in claim 17 wherein the segmented cylindrical peeling portion comprises a series of axially connected roller segments.

20. A peeling apparatus as in claim 19 wherein the diameter of the roller segment at the first end of each roller is less than the diameter of the roller segment at the second end.

21. A peeling apparatus as in claim 19 wherein the outer peeling surface of at least one roller segment is made of a different material than another roller segment.

22. A peeling apparatus as in claim 21 wherein the outer peeling surface of at least one roller segment is selected from the group consisting of rubber, polyurethane, and stainless steel.

23. A peeling apparatus as in claim 19 wherein the outer peeling surface of at least one roller segment has a different surface texture than another roller segment.

* * * * *